United States Patent
Viering et al.

(10) Patent No.: US 10,524,303 B2
(45) Date of Patent: Dec. 31, 2019

(54) RADIO LINK PROBLEM HANDLING IN MOBILE COMMUNICATION SYSTEMS

(71) Applicant: NOKIA SOLUTIONS AND NETWORKS OY, Espoo (FI)

(72) Inventors: Ingo Viering, Munich (DE); Lei Du, Beijing (CN); Yang Liu, Beijing (CN); Jarmo Tapani Makinen, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 15/570,298

(22) PCT Filed: Apr. 29, 2015

(86) PCT No.: PCT/EP2015/059408
§ 371 (c)(1),
(2) Date: Oct. 27, 2017

(87) PCT Pub. No.: WO2016/173650
PCT Pub. Date: Nov. 3, 2016

(65) Prior Publication Data
US 2018/0132300 A1    May 10, 2018

(51) Int. Cl.
*H04W 4/00* (2018.01)
*H04W 76/19* (2018.01)
(Continued)

(52) U.S. Cl.
CPC ........... *H04W 76/19* (2018.02); *H04W 76/11* (2018.02); *H04W 76/15* (2018.02); *H04W 76/38* (2018.02)

(58) Field of Classification Search
USPC ....... 370/242, 216, 252, 254, 311, 328, 329, 370/331, 338
See application file for complete search history.

(56) References Cited

U.S. PATENT DOCUMENTS

2010/0173633 A1* 7/2010 Catovic ................. H04W 24/02
                                                                  455/436
2011/0021154 A1* 1/2011 Marinier ............... H04W 72/02
                                                                  455/67.11
(Continued)

FOREIGN PATENT DOCUMENTS

WO     2012065646 A1     5/2012
WO     2014165346 A1     10/2014

OTHER PUBLICATIONS

3GPP TS 36.300 V12.3.0; 3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 12); Sophia Antipolis, France, Sep. 2014, 215 pages.
(Continued)

*Primary Examiner* — Phuongchau Ba Nguyen
(74) *Attorney, Agent, or Firm* — Brake Hughes Bellermann LLP

(57) ABSTRACT

There are provided measures for enabling/realizing more efficient radio link problem handling in a mobile communication system. Such measures exemplarily comprise detecting a radio problem of a radio link carrying a network connection of a communication device, and initiating a recovery procedure for recovering the connection on said radio link and a re-establishment procedure for re-establishing the connection on an alternative radio link, upon detection of the radio link problem, before a radio link failure of said radio link is declared.

19 Claims, 7 Drawing Sheets

(51) Int. Cl.
*H04W 76/15* (2018.01)
*H04W 76/38* (2018.01)
*H04W 76/11* (2018.01)

(56) References Cited

U.S. PATENT DOCUMENTS

| | | | |
|---|---|---|---|
| 2011/0268085 A1* | 11/2011 | Barany | H04W 36/0033 370/331 |
| 2015/0133122 A1* | 5/2015 | Chen | H04W 36/04 455/436 |
| 2015/0282107 A1* | 10/2015 | Vrind | H04W 56/003 370/252 |
| 2016/0014646 A1* | 1/2016 | Yiu | H04W 24/04 370/331 |
| 2017/0142741 A1* | 5/2017 | Kaur | H04W 56/002 |

OTHER PUBLICATIONS

3GPP TS 25.331 V12.3.0; 3rd Generation Partnership Project; Technical Specification Group Radio Access Network; Radio Resource Control (RRC); Protocol specification (Release 12); Sophia Antipolis, France, Sep. 2014, 4 pages.

3GPP TS 36.331 V12.3.0; 3rd Generation Partnership Project; Technical Specification Group Radio Access Network; Evolved Universal Terrestrial Radio Access (E-UTRA); Radio Resource Control (RRC); Protocol specification (Release 12); Sophia Antipolis, Sep. 2014, 378 pages.

International Search Report and Written Opinion for International Application No. PCT/EP2015/059408, dated Feb. 3, 2016 (11 pages).

Office Action for European Application No. 15721646.6, dated Nov. 4, 2019, 4 pages.

* cited by examiner

RADIO LINK PROBLEM HANDLING IN MOBILE COMMUNICATION SYSTEMS

CROSS-REFERENCE TO RELATED APPLICATIONS

This application is a national stage entry of PCT Application No. PCT/EP2015/059408 filed Apr. 29, 2015, entitled "RADIO LINK PROBLEM HANDLING IN MOBILE COMMUNICATION SYSTEMS" which is hereby incorporated by reference in its entirety.

FIELD

The present invention relates to radio link problem handling in a mobile communication system. More specifically, the present invention relates to measures (including methods, apparatuses and computer program products) for enabling/realizing more efficient radio link problem handling in a mobile communication system.

BACKGROUND

In mobile communication systems, such as e.g. any 3GPP communication system beginning from the second generation (2G, 3G, 4G, and beyond), like UMTS, LTE, LTE-A, etc., efficient (i.e. appropriate and fast) handling of radio link problems including radio link failures represents a vital issue.

This is because such radio link problems including radio link failures can never be avoided entirely, and an appropriate and fast remedy thereof is required in order to ensure reliable communications. For such remedy, the connection could be tried to be recovered on its initial radio link (or channel), or the connection could be tried to be re-established on a new/alternative radio link (or channel). Since maintaining the initial radio link is less expensive in terms of processing/signaling load and/or latency, connection re-establishment is tried only when necessary, i.e. when the initial radio link has failed with a certain degree of reliability.

In conventional solutions, upon detection of a radio problem of a radio link carrying a network connection of a communication device (such as a UE), a recovery procedure for recovering the connection on said radio link is initiated. Only when the recovery procedure has failed to recover the connection on said radio link within a time period for detection/declaration of a radio link failure (RLF) in the recovery procedure (i.e. when a radio link failure has been detected/declared as a result of the recovery procedure), a re-establishment procedure for re-establishing the connection on an alternative radio link is initiated.

FIG. 1 shows a schematic diagram of an example of a conventional mechanism for radio link problem handling, as outlined above.

As shown in FIG. 1, when a radio problem is detected/declared in a normal operation (in which the UE has a network connection on a radio link to a network device of a serving cell), the UE initiates a recovery procedure. Specifically, the UE waits for a certain time (denoted as T310 in LTE) before it detects/declares a radio link failure. During this period, the UE has the chance to recover on the existing radio link. This is referred to as "first phase". Only after this period, i.e. when the radio link failure is detected/declared, the UE starts a re-establishment procedure in order to look for an alternative radio link (to a network device of a new/target cell). This is referred to as "second phase". When the re-establishment procedure is not successful either, the UE goes back to idle operation.

Herein, generally, connection recovery refers to (an attempt to) maintain the existing radio link (or channel) to the serving cell and to communicate on the existing radio link (or channel), and connection re-establishment refers to (an attempt to) establish/prepare/set-up an alternative/new radio link (or channel) to a new/target cell and to communicate on the new/target radio link (or channel).

A mechanism as shown in FIG. 1 is for example applied in LTE or LTE-A, wherein the normal operation, the radio problem detection, the recovery procedure and the re-establishment procedure (RRC connection re-establishment) are performed with the UE operating in RRC_CONNECTED mode, while the UE operates in RRC_IDLE mode in the idle operation.

Like the mechanism shown in FIG. 1, all conventional solutions clearly separate in time the first phase of connection recovery on the existing radio link and the second phase of connection re-establishment on an alternative radio link. That is, all conventional solutions assume that radio link failure detection/declaration (as a result of a failed recovery procedure) and connection re-establishment have to occur sequentially such that re-establishment actions are only started after the radio link failure has been declared. This is inevitable, as it is a direct consequence of typical assumptions for current mobile communication systems, especially in that the UE can only transmit data to and (coherently) receive data from a single cell, since it is only synchronized with a single cell.

Since connection re-establishment is more expensive then connection recovery in terms of processing/signaling load and/or latency, the radio link failure detection/declaration is to be very reliable to give the UE the chance to recover before the radio link is detected/declared to be failed. That is, connection re-establishment is to be avoided as far as possible, since connection re-establishment (including searching for a good cell, synchronizing with the good cell, starting a random access procedure to the good cell, starting actions to recognize (authenticate) the UE, and setting up the new connection to the good cell) is rather complex, which is basically due to the fact that the new (good) cell, i.e. the connection re-establishment destination, is not aware of or prepared for the intended UE access (handover). However, achieving increased reliability of radio link failure detection/declaration requires more time (in the recovery procedure) and thus delays the time when the connection re-establishment is started. On the other hand, in order to ensure reliable communications, the radio link failure is to be detected/declared very fast to give the UE the chance to quickly re-establish the connection on a new radio link.

Due to fast fading or interference fluctuation, it may happen that the serving signal disappears abruptly (such that there is no time for a proper handover) only for a short period and quickly returns. In those cases of a temporary radio problem, i.e. a pseudo radio link failure, maintaining the radio link would be the preferable option rather than detecting/declaring a radio link failure and starting the connection re-establishment procedure. On the other hand, in cases of true radio link failures, quickly detecting/declaring a radio link failure and starting the connection re-establishment procedure would be the preferable option rather than maintaining the radio link. Yet, the UE has no chance to distinguish these cases of pseudo and true radio link failures in good time.

Quantitatively, it can be approximated that reliable radio link failure detection/declaration requires waiting for a coherence time of the link (or channel) which is in the range of 200 ms (assuming 3 km/h as worst case). Starting the connection re-establishment procedure afterwards would lead to an interruption of 400 ms interruption in case of a "true failure" assuming that the connection re-establishment takes 200 ms. But there is still the chance to recover within the waiting time of 200 ms, so in many cases the interruption time would be much less than 200 ms.

In the other extreme case, no waiting time would be applied at all, meaning that each and every radio problem (even if it is very short) leads to an interruption of 200 ms which is required for the connection re-establishment. In case of a "moderate" waiting time of e.g. 50 ms, the interruption time in case of a "true failure" would be reduced to 250 ms, but the chance for an earlier recovery in case of a "pseudo failure" would be significantly reduced as well. Further, any of the above assumptions would not allow small latencies at a large level of reliability ("ultra reliable communication"), and it seems impossible to reduce the interruption/latency below approximately 50 ms which is a typical requirement in 5G systems (not even talking about the 1 ms requirement).

Even if the connection re-establishment procedure could be significantly reduced, there is still a conflict which does not allow for an optimal solution:

On the one hand, radio link failure detection/declaration should be reliable to avoid that the expensive connection re-establishment procedure is initiated unnecessarily. That is, the interruption time in case of a "pseudo failure" shall be shortened.

On the other hand, radio link failure detection/declaration should be as fast as possible to accelerate the recovery procedure and, thus, the start of the connection re-establishment procedure. That is, the interruption time in case of a "true failure" shall be shortened.

As outlined above, conventional solutions for radio link problem handling assume that radio link failure detection/declaration (as a result of a failed recovery procedure) and connection re-establishment occur sequentially such that re-establishment actions are only started after radio link failure detection/declaration. Thus, conventional solutions suffer from a conflict of contradictory requisite in terms of reliability and latency of radio link failure detection/declaration.

Accordingly, there is a demand for enabling/realizing more efficient radio link problem handling in a mobile communication system.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising detecting a radio problem of a radio link carrying a network connection of a communication device, and initiating a recovery procedure for recovering the connection on said radio link and a re-establishment procedure for re-establishing the connection on an alternative radio link, upon detection of the radio link problem, before a radio link failure of said radio link is declared.

According to an example aspect of the present invention, there is provided an apparatus comprising a processor, and a memory configured to store computer program code, wherein the processor is configured to cause: detection of a radio problem of a radio link carrying a network connection of a communication device, and initiation of a recovery procedure for recovering the connection on said radio link and a re-establishment procedure for re-establishing the connection on an alternative radio link, upon detection of the radio link problem, before a radio link failure of said radio link is declared.

According to an example aspect of the present invention, there is provided an apparatus comprising means for detecting a radio problem of a radio link carrying a network connection of a communication device, and means for initiating a recovery procedure for recovering the connection on said radio link and a re-establishment procedure for re-establishing the connection on an alternative radio link, upon detection of the radio link problem, before a radio link failure of said radio link is declared.

According to an example aspect of the present invention, there is provided a computer program product comprising computer-executable computer program code which, when the program code is executed (or run) on a computer or the program is run on a computer (e.g. a computer of an apparatus according to any one of the aforementioned apparatus-related example aspects of the present invention), is configured to cause the computer to carry out the method according to the aforementioned method-related example aspect of the present invention.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, a more efficient radio link problem handling in a mobile communication system can be enabled/realized.

Thereby, appropriate, reliable and fast radio link problem handling can be achieved, and the conventional conflict of contradictory requisite in terms of reliability and latency of radio link failure detection can be resolved.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
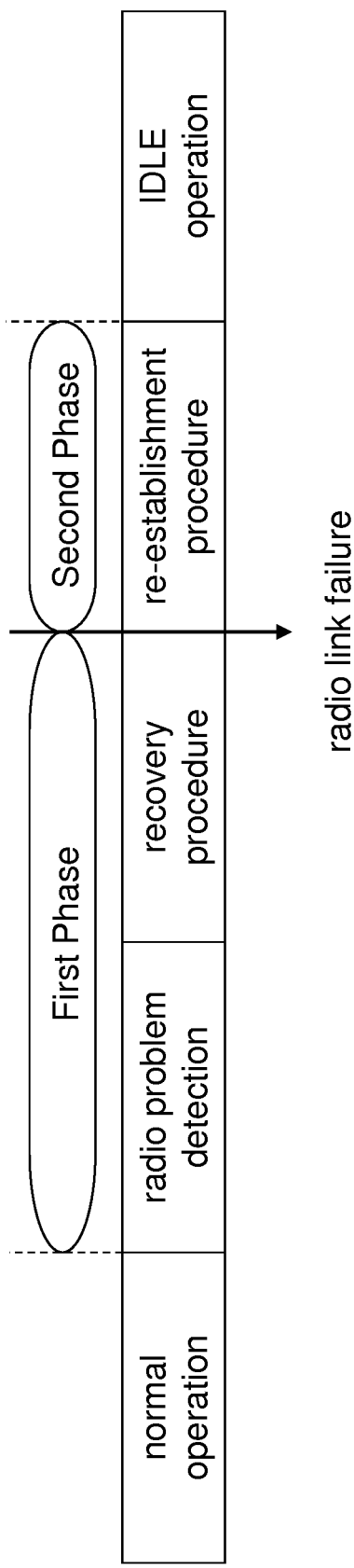
FIG. 1 shows a schematic diagram of an example of a conventional mechanism for radio link problem handling.

The present invention is described herein with reference to particular non-limiting examples and to what are presently considered to be conceivable embodiments of the present invention. A person skilled in the art will appreciate that the present invention is by no means limited to these examples and embodiments, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to 3GPP specifications being used as non-limiting examples. As such, the description of exemplifying embodiments given herein specifically refers to terminology which is directly related thereto. Such terminology is only used in the context of the presented non-limiting examples and embodiments, and does naturally not limit the invention in any way. Rather, any other system configuration or deployment may equally be utilized as long as complying with what is described herein and/or exemplifying embodiments described herein are applicable to it.

Hereinafter, various exemplifying embodiments and implementations of the present invention and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

Herein, a radio link problem is used as a term for any potential problem with a radio link, in which the radio link as such and/or a connection (e.g. a network connection of a device such as a UE) carried thereby is/can maintained, at least at first. Specifically, a radio link problem basically refers to bad quality on/of a radio link or connection. Such radio link problem can be detected (or, as interchangeable terms, discovered, recognized, measured, etc.) using any significant parameter such as signal strength, out-of-sync indicators, or the like.

Further, a radio link failure (RLF) is used as a term for any potential problem with a radio link, in which—as a result of a (prevailing) radio link problem—the radio link as such and/or a connection (e.g. a network connection of a device such as a UE) carried thereby is/can not maintained, at least eventually. Such radio link failure (RLF) can be declared (or, as interchangeable terms, decided, identified, indicated, etc.) using any significant parameter (with regard to the (prevailing) radio link problem) such as a time period for which the radio link problem persists, a threshold in terms of signal strength and/or out-of-sync indicators, or the like.

Still further, both detection of a radio link problem and declaration of a radio link failure (RLF) are basically referred to as local/internal actions of a communication device such as a UE, which has a (network) connection via a respective radio link. Specifically, a radio link failure (RLF) basically refers to radio link or connection outage/drop/breakdown (due to bad quality on/of the radio link or connection). That is, when reference is made herein to detection of a radio link problem and/or declaration of a radio link failure (RLF), this is meant to relate to a local/internal status of such device, irrespective of any local/internal and/or remote/external actions to be taken based thereon. As the case may be, such detection of a radio link problem and/or declaration of a radio link failure (RLF) can be reported/notified to a serving cell, which operates a subject radio link (suffering from a problem and/or a failure), and/or a network device of a target cell, which shall operate an alternative radio link intended to potentially replace a subject radio link (suffering from a problem and/or a failure).

According to exemplifying embodiments of the present invention, in general terms, there are provided measures and mechanisms for enabling/realizing a more efficient radio link problem handling in a mobile communication system.

More specifically, according to exemplifying embodiments of the present invention, a radio problem of a radio link carrying a network connection of a communication device is detected, and a recovery procedure for recovering the connection on said radio link and a re-establishment procedure for re-establishing the connection on an alternative radio link are initiated upon detection of the radio link problem, before a radio link failure (RLF) of said radio link is declared. Accordingly, the re-establishment procedure is started proactively even before the recovery procedure is completed and/or a radio link failure (RLF) is declared. That is, the recovery procedure and the re-establishment procedure are performed (at least partly) in parallel or simultaneously.

Figure 2:
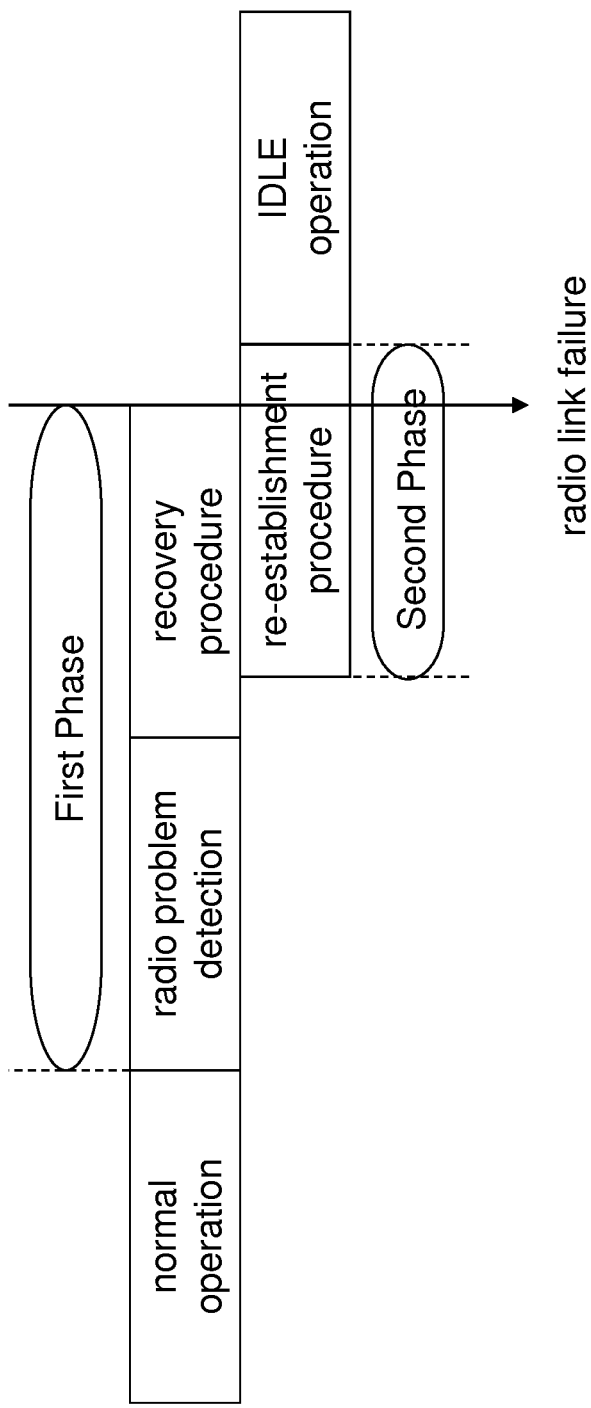
FIG. 2 shows a schematic diagram of an example of a mechanism for radio link problem handling according to exemplifying embodiments of the present invention.

FIG. 2 shows a schematic diagram of an example of a mechanism for radio link problem handling according to exemplifying embodiments of the present invention. Such mechanism can be realized by any communication device having a network connection over a radio link, such as a user equipment (UE) or any other terminal equipment.

As shown in FIG. 2, when a radio problem is detected in a normal operation (in which the UE has a network connection on a radio link to a network device, such as an eNB, of a serving cell), the UE initiates a recovery procedure. Specifically, the UE waits for a certain time (denoted as T310 in LTE) before it declares a radio link failure. During this period, the UE has the chance to recover on the existing radio link. This is again referred to as "first phase". Even in the course of this period, i.e. during the first phase when a radio link failure is not declared yet, the UE starts a re-establishment procedure in order to look for an alternative radio link (to a network device, such as an eNB, of a new/target cell). This is again referred to as "second phase". As an illustrative case shown in FIG. 2, when the radio link failure is declared as a result of the recovery procedure at the end of the first phase and the re-establishment procedure is not successful either at the end of the second phase, the UE goes back to idle operation.

While not shown in FIG. 2, in a case where the radio link failure is declared as a result of the recovery procedure at the end of the first phase and the re-establishment procedure is successful in the second phase, the UE goes on with (communication on) the alternative radio link. Further, in a case where the existing radio link can be recovered in the recovery procedure (i.e. no radio link failure is declared), the UE goes on with (communication on) the existing radio link, and the re-establishment procedure can be omitted (if not already started) or stopped (if already started).

A mechanism as shown in FIG. 2 can for example be applied in LTE or LTE-A, wherein the normal operation, the radio problem detection, the recovery procedure and the re-establishment procedure (RRC connection re-establishment) are performed with the UE operating in RRC_CONNECTED mode, while the UE operates in RRC_IDLE mode in the idle operation.

It is to be noted that radio problem detection and/or radio link failure declaration (including e.g. radio link failure detection) can be realized in any manner. For details on examples of radio problem detection and/or radio link failure detection, reference is made to 3GPP TS 36.331 for LTE systems and to 3GPP TS 25.331 for 3G systems.

Unlike the conventional mechanism shown in FIG. 1, the mechanism according to exemplary embodiments of the present invention does not separate in time the first phase of connection recovery on the existing radio link and the second phase of connection re-establishment on an alternative radio link. Rather, in the mechanism according to exemplary embodiments of the present invention, the first phase and the second phase significantly overlap each other such that the second phase can start before the first phase is completed. That is, the mechanism according to exemplary embodiments of the present invention assumes that radio link failure declaration, i.e. connection recovery, and connection re-establishment take place (at least partly) in parallel or simultaneously.

While a slight delay between start (or initiation) of the recovery procedure and start (or initiation) of the re-establishment procedure is shown in FIG. 2, it is noted that such delay is not required, and the recovery procedure and the re-establishment procedure can be started (or initiated) at the same time. If being started (or initiated) with a time offset, the re-establishment procedure can be started (or initiated) within a predefined time period (which may exemplarily be denoted as Txxx herein) after (start of initiation of) the recovery procedure, wherein the predefined time period (Txxx) is shorter than a time period for declaration of the radio link failure in the recovery procedure (which may exemplarily be denoted as T1 herein, corresponding e.g. to T310 in LTE).

Quantitatively, the mechanism according to exemplary embodiments of the present invention can significantly reduce the latency (until an appropriate handling of the radio problem) as compared with the above-described conventional mechanism, as evident from a comparison of FIGS. 1 and 2. Namely, as evident from FIG. 2, the latency can be reduced to a value which is the same as or only slightly larger than the waiting time in the recovery procedure, i.e. the time period for declaration of the radio link failure in the recovery procedure (i.e. T1 or e.g. T310 in LTE). This holds for all case, no matter whether the failure is a "true failure" or only a "pseudo failure", i.e. a temporary radio problem.

Given a certain time period for connection re-establishment in the re-establishment procedure (which may exemplarily be denoted as T2 herein), the waiting time in the recovery procedure, i.e. the time period for declaration of the radio link failure in the recovery procedure (i.e. T1 or e.g. T310 in LTE) shall be configured/set in the same range or order of magnitude. For example T1=T2 can hold. If re-establishment procedure is started immediately with the radio problem detection, i.e. at the same time as the recovery procedure, the resulting maximum interruption time is T2, i.e. the time period required to re-establish the connection re-establishment on an alternative radio link. Such maximum interruption time could be achieved with a setting of T1=0 in the conventional mechanism, but in such case an interruption of T2 would always occur, while using the mechanism according to exemplary embodiments of the present invention enables that have smaller interruption times when connection recovery on the existing radio link is successful.

The mechanism according to exemplary embodiments of the present invention is always applicable when the communication device is able to perform the recovery procedure and the re-establishment procedure (at least partly) in parallel or simultaneously. This may be the case under various assumptions, for example at least in the following cases:

The communication device (or UE) has at least two transceiver chains for simultaneously communicating on the existing radio link and the alternative radio link (i.e. transmitting data to and (coherently) receiving data from at least two cells) and/or synchronizing with a network device of a serving cell, which operates the existing radio link, and a network device of a target cell, which is designated to operate the alternative radio link in the re-establishment procedure. That is, the communication device (or UE) has at least two independent receive/transmit chains such that it can start synchronization and a random access procedure (on RACH) with a target cell while it is still monitoring the source cell.

The communication device (or UE) is simultaneously synchronized with a network device of a serving cell, which operates the existing radio link, and a network device of a target cell, which is designated to operate the alternative radio link in the re-establishment procedure. This can be based on a corresponding mutual synchronization between the network device of the serving call and the network device of the target cell. That is, like in "ultra dense networks" for 5G systems, the cells are perfectly synchronized and small enough, such that the communication device (or UE) is inherently synchronized with its serving cell (or source cell) as well as neighbor cells (including the target cell), and such that no timing advance is needed at all.

In the following, non-limiting examples of methods for radio link problem handling according to exemplifying embodiments of the present invention are described with reference to FIGS. 4 and 5. The thus illustrated methods may be implemented/realized at/by a terminal equipment such as a user equipment (UE) having a network connection via a radio link with a serving cell.

Figure 3:
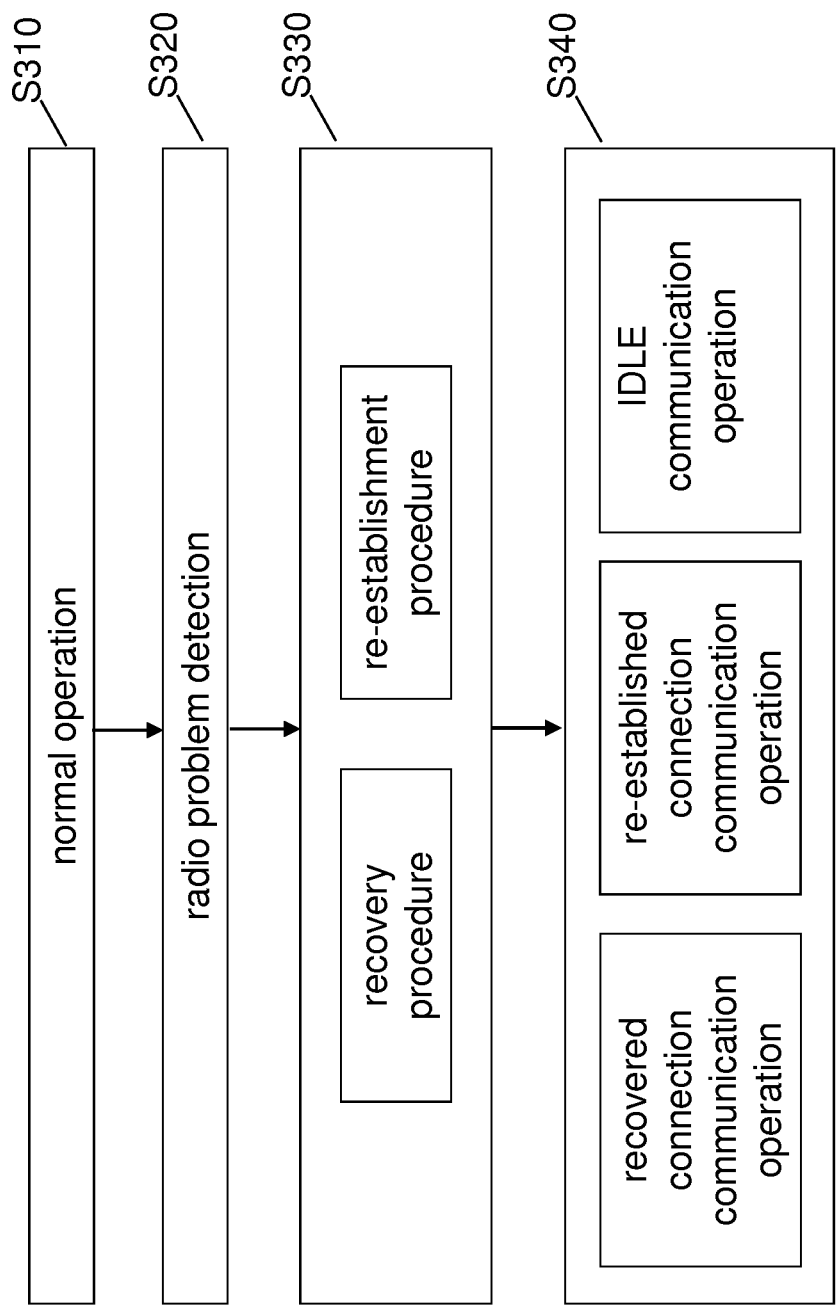
FIG. 3 shows a flowchart illustrating an example of a method for radio link problem handling according to exemplifying embodiments of the present invention, FIG. 4 (composed of FIGS. 4A and 4B) shows a flowchart illustrating another example of a method for radio link problem handling according to exemplifying embodiments of the present invention.

FIG. 3 shows a flowchart illustrating an example of a method for radio link problem handling according to exemplifying embodiments of the present invention.

In step S310, the UE performs a normal operation, i.e. communication via the connection on the existing radio link to the serving cell. In step S320, the UE detects a radio problem of the existing radio link. Thereupon, the UE initiates a recovery and re-establishment operation in step S330, in which a recovery procedure for recovering the connection on the existing radio link to the serving cell and a re-establishment procedure for re-establishing the connection on an alternative radio link to a target cell are initiated and performed. As a result of the recovery and re-establishment operation in step S330, the UE performs an appropriate communication operation in step S340.

In the following, some examples of the communication operation in step S340 are given.

When the existing radio link can be recovered in the recovery procedure, the connection re-establishment (i.e. preparation of an alternative radio link) is stopped, and communication is performed via the recovered connection on the existing radio link (denoted as recovered connection communication operation). That is, when the recovery procedure succeeds to recover the connection on the existing radio link within a time period for declaration of the radio link failure in the recovery procedure, the re-establishment procedure is stopped when the re-establishment procedure is in progress, and it is communicated via the recovered connection on the existing radio link. In such situation, it is advantageous to inform the target cell of the alternative radio link, e.g. by sending an additional signaling. Otherwise, the target cell may get confused if it has already received signaling of a random access procedure (on RACH) or the re-establishment request, but does not get any further response or signaling.

When the existing radio link can not be recovered in the recovery procedure, the radio link failure is declared, and the re-establishment procedure (i.e. preparation of an alternative radio link) is tried to be completed, probably in a very short time. When completed successfully, communication is performed via the re-established connection on the alternative radio link (denoted as re-established connection communication operation). That is, when the recovery procedure fails to recover the connection on the existing radio link within a time period for declaration of the radio link failure in the recovery procedure before the re-establishment procedure is completed, the radio link failure of the existing radio link is declared, and the re-establishment procedure for re-establishing the connection on the alternative radio link is completed.

When the re-establishment procedure (i.e. preparation of the alternative radio link) can be completed before completion of the recovery procedure (i.e. before the first phase expires, practically before the corresponding timer expires), the recovery procedure is stopped, and communication is performed via the re-established connection on the alternative radio link (denoted as re-established connection communication operation). This will minimize the latency. That is, when the re-establishment procedure succeeds to re-establish the connection on the alternative radio link before the recovery procedure is completed or when the recovery procedure fails to recover the connection on the existing radio link, it is communicated via the re-established connection on the alternative radio link. In such situation, it is advantageous to inform the serving cell of the existing radio link, e.g. by sending an additional signaling. Otherwise, the serving cell may get confused because of not getting any further response or signaling.

When both the connection recovery and the connection re-establishment (i.e. preparation of an alternative radio link) fail to succeed, i.e. neither the existing radio link can be maintained, nor an alternative radio link can be prepared, communication (or the UE) is brought to an idle state (denoted as IDLE communication operation).

Figure 4A:
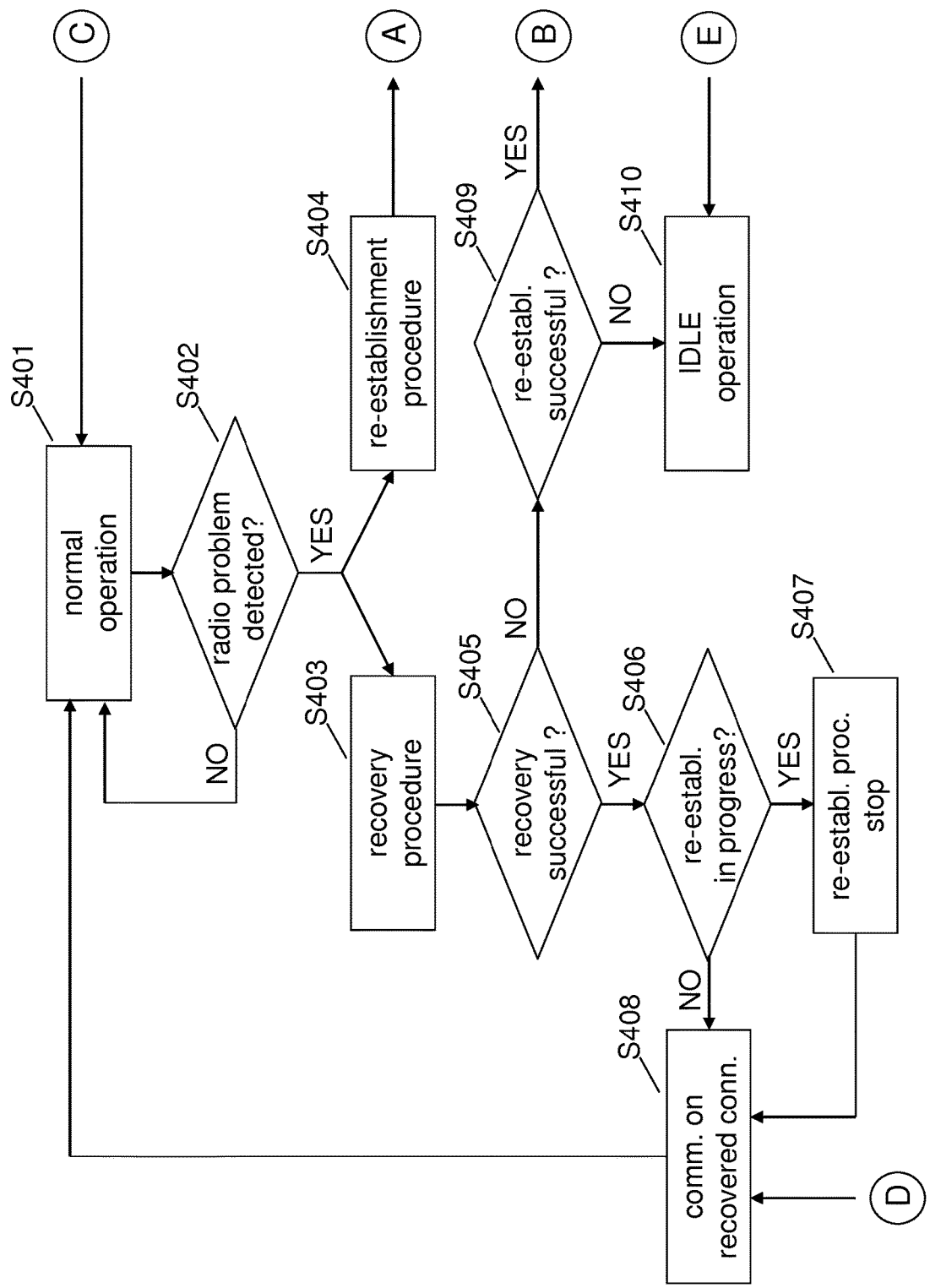
Figure 4B:
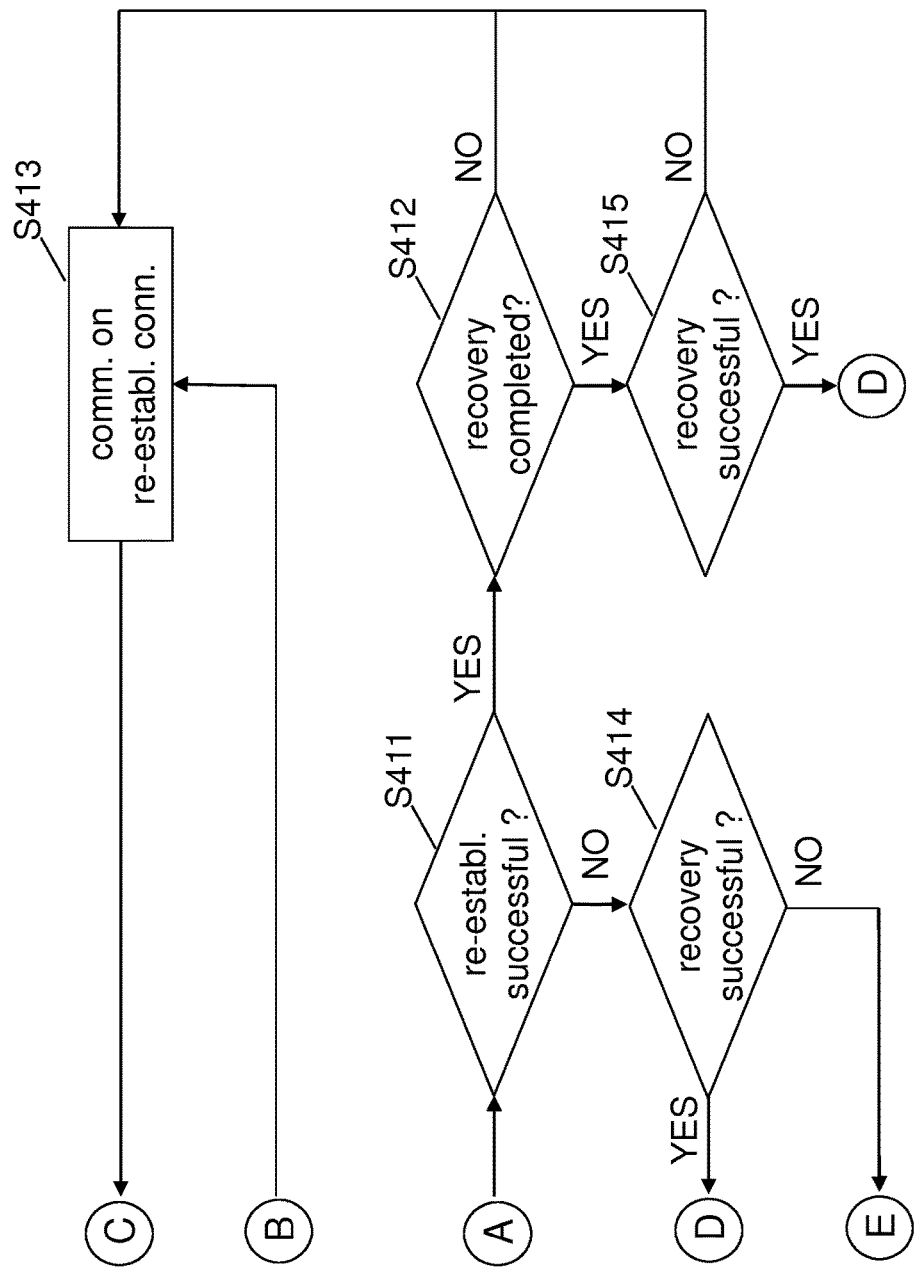

FIG. 4 (composed of FIGS. 4A and 4B) shows a flowchart illustrating another example of a method for radio link problem handling according to exemplifying embodiments of the present invention.

In step S401, the UE performs a normal operation, i.e. communication via the connection on the existing radio link to the serving cell. In step S402, the UE detects a radio problem of the existing radio link. Such detection of the radio link problem can be reported/notified to a serving cell, which operates the subject radio link and/or a network device of a target cell, which shall operate an alternative radio link intended to potentially replace the subject radio link. By reporting to or notifying the serving cell accordingly, the network device thereof can be prompted to or triggered for a subsequent recovery procedure to be initiated. By reporting to or notifying the target cell accordingly, the network device thereof can be prompted to or triggered for a subsequent re-establishment procedure to be initiated.

Thereupon, the UE initiates a recovery procedure in step S403 and (potentially with some slight delay) a re-establishment procedure in step S404. That is, in the situation of a bad radio link (or channel) towards a serving cell, the UE initiates both connection recovery in the serving cell and (preliminary) connection re-establishment procedure in an alternative cell before it finally declares the existing link failed.

If the recovery procedure in step S403 has succeeded in recovering the connection on the existing radio link within the waiting time T1 (i.e. YES in step S405), it is determined in step S406 whether or not the re-establishment procedure is in progress, i.e. has been initiated but is not completed. If so (i.e. YES in step S406), the re-establishment procedure is stopped in step S407, and the method proceeds to step S408. If not (i.e. NO in step S406), the method directly proceeds to step S408. If the existing link can be recovered within the given time and the re-establishment procedure has already been started (but not completed), a message can be sent to the re-establishment destination indicating that the re-establishment is stopped. In step S408, the communication is continued via the recovered connection on the existing radio link to the serving cell in step S408. Thereafter, the method returns to step S401, where a normal operation is performed again, i.e. communication via the recovered connection on the existing radio link to the serving cell. Such declaration of a radio link failure can be reported/notified to a serving cell, which operates the subject radio link and/or a network device of a target cell, which shall operate an alternative radio link intended to potentially replace the subject radio link. By reporting to or notifying the serving cell accordingly, the network device thereof can be informed about a stop of communication on the radio link to be expected and the need/attempt for re-establishment of an alternative radio link with another cell. By reporting to or notifying the target cell accordingly, the network device thereof can be informed about the need for re-establishment of an alternative radio link with its cell (in order to maintain the UE's network connection).

If the recovery procedure in step S403 has failed in recovering the connection on the existing radio link within the waiting time T1 (i.e. NO in step S405), the radio link failure is declared (i.e. presence of the radio link failure is declared) and the waiting time (timer) for declaration of the radio link failure is stopped. That is, if the existing link cannot be recovered within a certain time (and the re-establishment procedure has not been completed in the meantime), a failure is declared and the already started re-establishment procedure is continued and completed.

Further, the method proceeds to step S409, where it is determined whether or not the re-establishment procedure has succeeded in re-establishing the connection on an alternative radio link within the predefined time period T2. If not (i.e. NO in step S409), an IDLE operation is performed in step S410. If so (i.e. YES in step S409), a handover is performed, and the communication is continued via the re-established connection on the alternative radio link to the target cell in step S413. Thereafter, the method returns to step S401, where a normal operation is performed again, i.e. communication via the re-established connection on the alternative radio link to the target cell.

If the re-establishment procedure in step S404 has succeeded in re-establishing the connection on the alternative radio link within the predefined time period T2 (i.e. YES in step S411), it is determined in step S412 whether or not the recovery procedure is completed. If the recovery procedure is completed (i.e. YES in step S412), the method proceeds to step S415, where it is determined whether or not the recovery procedure has succeeded in recovering the connection on the existing radio link within the waiting time T1. If so (i.e. YES in step S415), the method proceeds to step S408, where the communication is continued via the recovered connection on the existing radio link to the serving cell, as described above. As an alternative in this situation, the method could also proceed to step S413, where a handover is performed, and the communication is continued via the re-established connection on the alternative radio link to the target cell, or a decision could be made as to whether to proceed to step S408 or step S413. If not (i.e. NO in step S415), or if the recovery procedure is not completed (i.e. NO in step S412), the communication is continued via the re-established connection on the alternative radio link to the target cell in step S413. That is, if the re-establishment procedure can be completed before the existing link is recovered (and before the timer expires), the UE continues with the re-established cell.

If the re-establishment procedure in step S404 has failed in re-establishing the connection on the alternative radio link within the predefined time period T2 (i.e. NO in step S411), it is determined in step S414 whether or not the recovery procedure has succeeded in recovering the connection on the existing radio link within the waiting time T1. If so (i.e. YES in step S414), the method proceeds to step S408, where the communication is continued via the recovered connection on the existing radio link to the serving cell. If not (i.e. NO in step S414), an IDLE operation is performed in step S410.

It is to be noted that the above-described sequence of steps in the method shown in FIG. 4 is of exemplary nature and for illustrative purposes only. The sequence of steps can also be different, as long as equivalent results and/or effects can be achieved. Also, at least some steps can be carried out (at least partly) in parallel or simultaneously, as far as being inherently independent from each other.

According to exemplifying embodiments of the present invention, the above-described mechanism can be implemented in any mobile communication system, such as e.g. any 3GPP communication system beginning from the second generation (2G, 3G, 4G, and beyond), like UMTS, LTE, LTE-A, etc.

For example, an implementation in a LTE or LTE-A system could be realized using available parameters T310, N310 and N311 (provided in ue-TimersAndContents in SystemInformationBlockType2), as follows.

A radio problem can be detected using the parameter N310. When N310 out-of-sync indicators are received at the UE, the timer T310 for the recovery procedure and the timer Txxx for a time lag or delay between the recovery procedure and the re-establishment procedure can be started, with Txxx<T310. When N311 in-sync indicators are received at the UE, the timers 310 and Txxx can be stopped, since the connection recovery has been successful. If the timer Txxx expires, the UE can initiate the re-establishment procedure while still monitoring in-sync indicators in the old (serving) cell. In the re-establishment procedure, can searches a new (target) cell, initiate a random access procedure (on RACH), and send a re-establishment request.

If re-establishment is confirmed, the timer T310 can be stopped, and the old (serving) cell can be notified of the stop of the recovery procedure. To this end, a message (recovery stop notification) can be sent from the UE to the new (target) cell, which indicates that the re-establishment procedure has stopped the timer T310, i.e. the previously started recovery procedure has been stopped (possibly with more details on this event). The new (target) cell can forward this message to the old (serving) cell (which corresponds to a recovery destination representing a designated destination for recovering the connection in the recovery procedure).

When N311 in-sync indicators are received before re-establishment is confirmed (but after the timer Txxx has expired), the timer T310 can be stopped, and the new (target) cell can be notified of the stop of the re-establishment procedure. To this end, a message (re-establishment stop notification) can be sent from the UE to the old (serving) cell, which indicates that an already started re-establishment procedure has been stopped. The old (serving) cell can forward this message to the new (target) cell (which corresponds to a re-establishment destination representing a designated destination for re-establishing the connection in the re-establishment procedure).

By way of any one of the aforementioned notifications, potential confusion regarding the further process can be avoided at a respective (i.e. responsible and/or affected) network device or cell.

When the timer T310 expires and a re-establishment procedure is still running, RLF is declared, and the re-establishment procedure is continued. The subsequent process is similar with the conventional mechanism, depending on the result of the re-establishment procedure.

When the timer T310 expires and a re-establishment procedure has already failed, RLF is declared, and the UE goes to idle operation. In such situation, a NAS procedure will probably initiate connection establishment.

By virtue of exemplifying embodiments of the present invention, as evident from the above, a more efficient radio link problem handling in a mobile communication system can be enabled/realized. Thereby, appropriate, reliable and fast radio link problem handling can be achieved, and the conventional conflict of contradictory requisite in terms of reliability and latency of radio link failure declaration can be resolved.

Generally, the mechanism of radio link problem handling according to exemplifying embodiments of the present invention is such that connection re-establishment (or handover) is started in advance of a radio link failure, i.e. before a recovery procedure for an existing link (or channel) has ended. Accordingly, a fast remedy for radio link problems including radio link failures can be achieved, which generally causes less latency and or interruption times than conventional solutions.

Stated in other words, in the mechanism of radio link problem handling according to exemplifying embodiments of the present invention, a re-establishment procedure is started (far) before a radio link failure is declared. This is particularly possible under certain assumptions which are valid e.g. for 5G system and/or specifically configured communication devices. Thus, an advantage can be achieved in that the radio problem remedy (including connection recovery and/or re-establishment) after a radio problem can be accomplished (much) faster, since an alternative radio link (or channel) can already be prepared and/or that a new cell can already be aware of or prepared for an intended access (handover).

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 5 and 6, while for the sake of brevity reference is made to the detailed description of respective corresponding configurations/setups, schemes, methods and functionality, principles and operations according to FIGS. 2 to 4.

Figure 5:
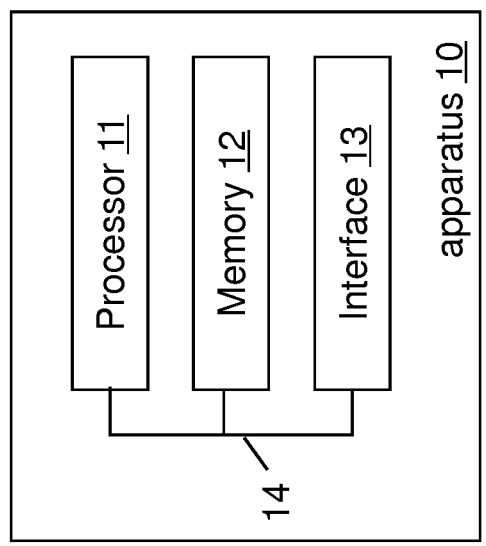
FIG. 5 shows a schematic diagram illustrating an example of a structure of an apparatus according to exemplifying embodiments of the present invention.
Figure 6:
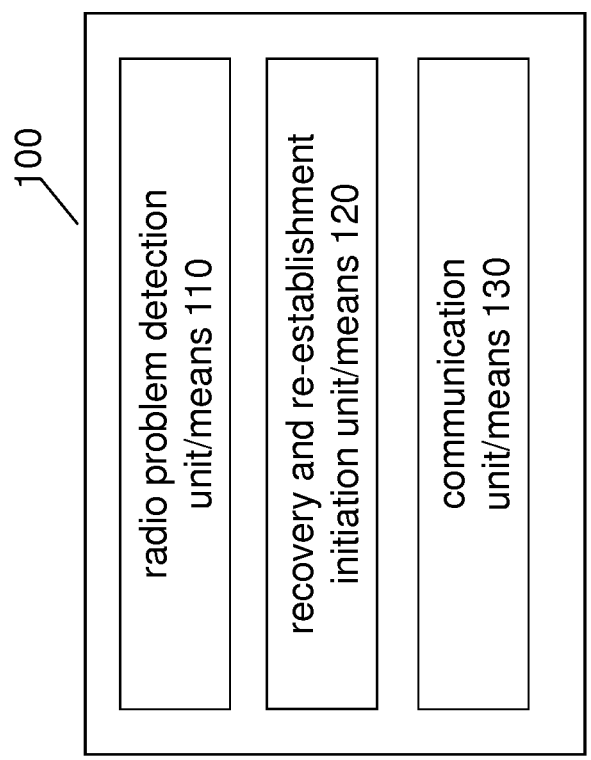
FIG. 6 shows a schematic diagram illustrating another example of a structure of an apparatus according to exemplifying embodiments of the present invention.

In FIGS. 5 and 6, the blocks are basically configured to perform respective methods, procedures and/or functions as described above. The entirety of blocks are basically configured to perform the methods, procedures and/or functions as described above, respectively. With respect to FIGS. 5 and 6, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 5 and 6, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 5 shows a schematic diagram illustrating an example of a structure of an apparatus according to exemplifying embodiments of the present invention.

As indicated in FIG. 5, according to exemplifying embodiments of the present invention, an apparatus 10 may comprise at least one processor 11 and at least one memory 12 (and possibly also at least one interface 13), which may be operationally connected or coupled, for example by a bus 14 or the like, respectively.

The processor 11 and/or the interface 13 of the apparatus 10 may also include a modem or the like to facilitate communication over a (hardwire or wireless) link, respectively. The interface 13 of the apparatus 10 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 13 of the apparatus 10 is generally configured to communicate with at least one other apparatus, device, node or entity (in particular, the interface thereof).

The memory 12 of the apparatus 10 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 12 of the apparatus 10 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 10 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to exemplifying embodiments of the present invention, the thus illustrated apparatus 10 may represent or realize/embody a (part of a) communication device, including a terminal equipment such as a user equipment. Specifically, the thus illustrated apparatus 10 may be configured to perform a procedure and/or exhibit a functionality and/or implement a mechanism, as described, in any one of FIGS. 2 to 4.

Accordingly, the apparatus 10 may be caused or the apparatus 10 or its processor 11 (possibly together with computer program code stored in the memory 12), in its most basic form, is configured to detect (or, for detection of) a radio problem of a radio link carrying a network connection of a communication device, and to initiate (or, for initiation of) a recovery procedure for recovering the connection on said radio link and a re-establishment procedure for re-establishing the connection on an alternative radio link, upon detection of the radio link problem, before a radio link failure of said radio link is declared.

As mentioned above, any apparatus according to exemplifying embodiments of the present invention may be structured by comprising respective units or means for performing corresponding operations, procedures and/or functions. For example, such units or means may be implemented/realized on the basis of an apparatus structure, as exemplified in FIG. 5, i.e. by one or more processors 11, one or more memories 12, one or more interfaces 13, or any combination thereof.

FIG. 6 shows a schematic diagram illustrating another example of a structure of an apparatus according to exemplifying embodiments of the present invention.

As shown in FIG. 6, an apparatus 100 according to exemplifying embodiments of the present invention may comprise (at least) a unit or means for detecting (or, detection of) a radio problem of a radio link carrying a network connection of a communication device (denoted as radio problem detection unit/means 110), and a unit or means for initiating (or, initiation of) a recovery procedure for recovering the connection on said radio link and a re-establishment procedure for re-establishing the connection on an alternative radio link, upon detection of the radio link problem, before a radio link failure of said radio link is declared (denoted as recovery and re-establishment initiation unit/means 120). The operability/functionality of the radio problem detection unit/means 110 basically corresponds to that of step S320 of FIG. 3 above, and the operability/functionality of the recovery and re-establishment initiation unit/means 120 basically corresponds to that of step S330 of FIG. 3 above.

As shown in FIG. 6, the apparatus 100 according to exemplifying embodiments of the present invention may comprise (at least) a unit or means for communicating via a network connection on a radio link (or channel) (denoted as communication unit/means 130). The operability/functionality of the communication unit/means 130 basically corresponds to that of steps S310 and S340 of FIG. 3 above.

For further details regarding the operability/functionality of the individual apparatuses (or units/means thereof) according to exemplifying embodiments of the present invention, reference is made to the above description in connection with any one of FIGS. 2 to 4, respectively.

According to exemplifying embodiments of the present invention, any one of the processor, the memory and the interface, as well as any one of the units/means, may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing more efficient radio link problem handling in a mobile communication system. Such measures exemplarily comprise detecting a radio problem of a radio link carrying a network connection of a communication device, and initiating a recovery procedure for recovering the connection on said radio link and a re-establishment procedure for re-establishing the connection on an alternative radio link, upon detection of the radio link problem, before a radio link failure of said radio link is declared.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
AP Access Point
eNB enhanced Node B (LTE/LTE-A base station)
LTE Long Term Evolution
LTE-A Long Term Evolution Advanced
NAS Non-Access Stratum
RACH Random Access CHannel
RLF Radio Link Failure
RRC Radio resource Control
UE User Equipment
UMTS Universal Mobile Telecommunications Sys

The invention claimed is:
1. A method comprising:
  detecting a radio problem of a radio link carrying a network connection of a communication device; and initiating a recovery procedure for recovering the connection on said radio link and a re-establishment procedure for re-establishing the connection on an alternative radio link, upon detection of the radio link problem, before a radio link failure of said radio link is declared, wherein the re-establishment procedure and the recovery procedure are initiated at the same time or the re-establishment procedure is initiated within a predefined time period after the recovery procedure, and the predefined time period is shorter than a time period for declaration of the radio link failure in the recovery procedure.

2. The method according to claim 1, wherein, when the recovery procedure fails to recover the connection on said radio link upon lapse of a time period for declaration of the radio link failure in the recovery procedure before the re-establishment procedure is completed, the method further comprising:

declaring presence of the radio link failure of said radio link; and completing the re-establishment procedure for re-establishing the connection on said alternative radio link.

3. The method according to claim 1, wherein, when the re-establishment procedure succeeds to re-establish the connection on said alternative radio link before the recovery procedure is completed, the method further comprising:

communicating via the re-established connection on said alternative radio link.

4. The method according to claim 3, wherein a recovery stop notification is caused to be transmitted at least to a network device of a target cell, which operates said alternative radio link.

5. The method according to claim 1, wherein, when the recovery procedure succeeds to recover the connection on said radio link before lapse of a time period for declaration of the radio link failure in the recovery procedure, the method further comprising:

stopping the re-establishment procedure when the re-establishment procedure is in progress; and communicating via the recovered connection on said radio link.

6. The method according to claim 5, wherein a re-establishment stop notification is caused to be transmitted at least to a network device of a serving cell, which operates said radio link.

7. The method according to claim 1, wherein:

the communication device has at least two transceiver chains for simultaneously communicating on said radio link and said alternative radio link and/or synchronizing with a network device of a serving cell, which operates said radio link, and a network device of a target cell, which is designated to operate said alternative radio link in the re-establishment procedure.

8. The method according to claim 1, wherein:

the communication device is simultaneously synchronized with a network device of a serving cell, which operates said radio link, and a network device of a target cell, which is designated to operate said alternative radio link in the re-establishment procedure.

9. The method according to claim 1, wherein:

the method is operable at or by the communication device; and/or the communication device is a terminal equipment or a user equipment.

10. A computer program product comprising computer-executable computer program code which, when the computer program code is executed on a computer, is configured to cause the computer to carry out the method according to claim 1.

11. An apparatus comprising:

at least one processor; and at least one memory including a computer program code;

the at least one memory and the computer program code are configured to, with the at least one processor, cause the apparatus to at least:

detect a radio problem of a radio link carrying a network connection of a communication device; and initiate a recovery procedure for recovering the connection on said radio link and a re-establishment procedure for re-establishing the connection on an alternative radio link, upon detection of the radio link problem, before a radio link failure of said radio link is declared, wherein the re-establishment procedure and the recovery procedure are initiated at the same time or the re-establishment procedure is initiated within a predefined time period after the recovery procedure, and the predefined time period is shorter than a time period for declaration of the radio link failure in the recovery procedure.

12. The apparatus according to claim 11, wherein, when the recovery procedure fails to recover the connection on said radio link upon lapse of a time period for declaration of the radio link failure in the recovery procedure before the re-establishment procedure is completed, the at least one memory and the computer program code are further configured to, with the at least one processor, cause the apparatus to at least:

declare presence of the radio link failure of said radio link; and completion of the re-establishment procedure for re-establishing the connection on said alternative radio link.

13. The apparatus according to claim 11, wherein, when the re-establishment procedure succeeds to re-establish the connection on said alternative radio link before the recovery procedure is completed, the at least one memory and the computer program code are further configured to, with the at least one processor, cause the apparatus to at least:

communicate via the re-established connection on said alternative radio link.

14. The apparatus according to claim 13, the at least one memory and the computer program code are further configured to, with the at least one processor, cause the apparatus to at least transmit a recovery stop notification at least to a network device of a target cell, which operates said alternative radio link.

15. The apparatus according to claim 11, wherein, when the recovery procedure succeeds to recover the connection on said radio link before lapse of a time period for declaration of the radio link failure in the recovery procedure, the at least one memory and the computer program code are further configured to, with the at least one processor, cause the apparatus to at least:

stop the re-establishment procedure when the re-establishment procedure is in progress; and communicate via the recovered connection on said radio link.

16. The apparatus according to claim 15, the at least one memory and the computer program code are further configured to, with the at least one processor, cause the apparatus to at least transmit a re-establishment stop notification at least to a network device of a serving cell, which operates said radio link.

17. The apparatus according to claim 11, wherein:
the communication device has at least two transceiver chains configured for a simultaneous communication on said radio link and said alternative radio link and/or synchronization with a network device of a serving cell, which operates said radio link, and a network device of a target cell, which is designated to operate said alternative radio link in the re-establishment procedure.

18. The apparatus according to claim 11, wherein:
the communication device is configured for simultaneous synchronization with a network device of a serving cell, which operates said radio link, and a network device of a target cell, which is designated to operate said alternative radio link in the re-establishment procedure.

19. The apparatus according to claim 11, wherein:
the apparatus is operable as or at the communication device; and/or
the communication device is a terminal equipment or a user equipment.

* * * * *